United States Patent
Abbondanzio et al.

(10) Patent No.: US 7,415,519 B2
(45) Date of Patent: Aug. 19, 2008

(54) SYSTEM AND METHOD FOR PREVENTION OF BOOT STORMS IN A COMPUTER NETWORK

(75) Inventors: Antonio Abbondanzio, Raleigh, NC (US); William W. Buchanan, Jr., Wake Forest, NC (US); Simon Chu, Chapel Hill, NC (US); Gregory William Dake, Durham, NC (US); Stephen Woodrow Murphrey, Apex, NC (US); William Joseph Piazza, Holly Springs, NC (US); Gregory Brian Pruett, Raleigh, NC (US); David Benson Rhoades, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 633 days.

(21) Appl. No.: 10/184,202

(22) Filed: Jun. 28, 2002

(65) Prior Publication Data
US 2004/0003082 A1   Jan. 1, 2004

(51) Int. Cl.
*G06F 15/173* (2006.01)
(52) U.S. Cl. .............. 709/226; 709/212; 709/220; 709/242; 709/248; 709/251
(58) Field of Classification Search ........... 709/225, 709/211, 217, 203, 223, 227, 242, 248, 251, 709/226, 212, 220; 375/376
See application file for complete search history.

(56) References Cited

U.S. PATENT DOCUMENTS

| | | | |
|---|---|---|---|
| 5,805,804 A | * | 9/1998 | Laursen et al. .............. 709/223 |
| 5,848,244 A | * | 12/1998 | Wilson ........................ 709/221 |
| 5,999,989 A | * | 12/1999 | Patel ............................. 710/1 |
| 6,005,759 A | * | 12/1999 | Hart et al. ...................... 361/66 |
| 6,078,951 A | * | 6/2000 | Pashupathy et al. .......... 709/217 |
| 6,115,764 A | | 9/2000 | Chisholm et al. ............ 710/100 |
| 6,117,188 A | * | 9/2000 | Aronberg et al. ............. 717/176 |
| 6,128,642 A | * | 10/2000 | Doraswamy et al. ......... 709/201 |
| 6,138,234 A | * | 10/2000 | Lee et al. ........................ 713/2 |
| 6,182,122 B1 | * | 1/2001 | Berstis ........................ 709/217 |

(Continued)

OTHER PUBLICATIONS

TDB article No. 145 p. 1238:, titled: Secondary Help Available from Text of Common Tooltip, Thomas R. Haynes et al. Jul. 2001.

*Primary Examiner*—Bunjob Jaroenchonwanit
*Assistant Examiner*—Lan-Dai T Truong
(74) *Attorney, Agent, or Firm*—Patrick J. Daugherty; Driggs, Hogg, Daugherty & Del Zoppo Co., LPA

(57) ABSTRACT

This invention is useful in a networked system with densely packaged servers or server blades. The servers are connected to a system management network, a communication network and an image server. A management module attached to the system management network and a network switch monitors and controls network booting from an image server on the communication network to prevent over commitment of network and image server resources in order to avoid a boot storm. The management module collects system information and calculates the number of servers or clients the networked system can boot at any one instant of time without burdening the system. The management module logic controls booting via the system management network and service processor elements, which can block server booting and release servers to boot when other servers have completed their boot process.

16 Claims, 3 Drawing Sheets

U.S. PATENT DOCUMENTS

| | | | |
|---|---|---|---|
| 6,195,703 B1 | 2/2001 | Blumenau et al. | 709/239 |
| 6,330,687 B1 | 12/2001 | Griffith | 714/6 |
| 6,347,398 B1* | 2/2002 | Parthasarathy et al. | 717/178 |
| 6,452,809 B1* | 9/2002 | Jackson et al. | 361/796 |
| 6,662,230 B1* | 12/2003 | Eichstaedt et al. | 709/229 |
| 6,684,343 B1* | 1/2004 | Bouchier et al. | 714/4 |
| 6,753,887 B2* | 6/2004 | Carolan et al. | 715/764 |
| 6,754,206 B1* | 6/2004 | Nattkemper et al. | 370/369 |
| 6,799,276 B1* | 9/2004 | Belissent | 713/201 |
| 6,904,482 B2* | 6/2005 | Rietze et al. | 710/107 |
| 6,915,336 B1* | 7/2005 | Hankejh et al. | 709/219 |
| 2001/0047473 A1* | 11/2001 | Fallon | 713/2 |
| 2002/0053029 A1* | 5/2002 | Nakamura et al. | 713/201 |
| 2002/0166085 A1* | 11/2002 | Peikari | 714/38 |
| 2002/0199116 A1* | 12/2002 | Hoene et al. | 713/201 |
| 2003/0018974 A1* | 1/2003 | Suga | 725/86 |
| 2003/0051021 A1* | 3/2003 | Hirschfeld et al. | 709/223 |
| 2003/0061367 A1* | 3/2003 | Shah | 709/230 |
| 2003/0061619 A1* | 3/2003 | Giammaressi | 725/95 |
| 2003/0069953 A1* | 4/2003 | Bottom et al. | 709/223 |
| 2003/0097428 A1* | 5/2003 | Afkhami et al. | 709/220 |
| 2003/0115443 A1* | 6/2003 | Cepulis et al. | 713/2 |
| 2003/0126195 A1* | 7/2003 | Reynolds et al. | 709/203 |
| 2003/0128698 A1* | 7/2003 | Darland et al. | 370/360 |
| 2003/0145294 A1* | 7/2003 | Ward et al. | 716/5 |
| 2003/0233535 A1* | 12/2003 | Nunn et al. | 713/1 |

\* cited by examiner

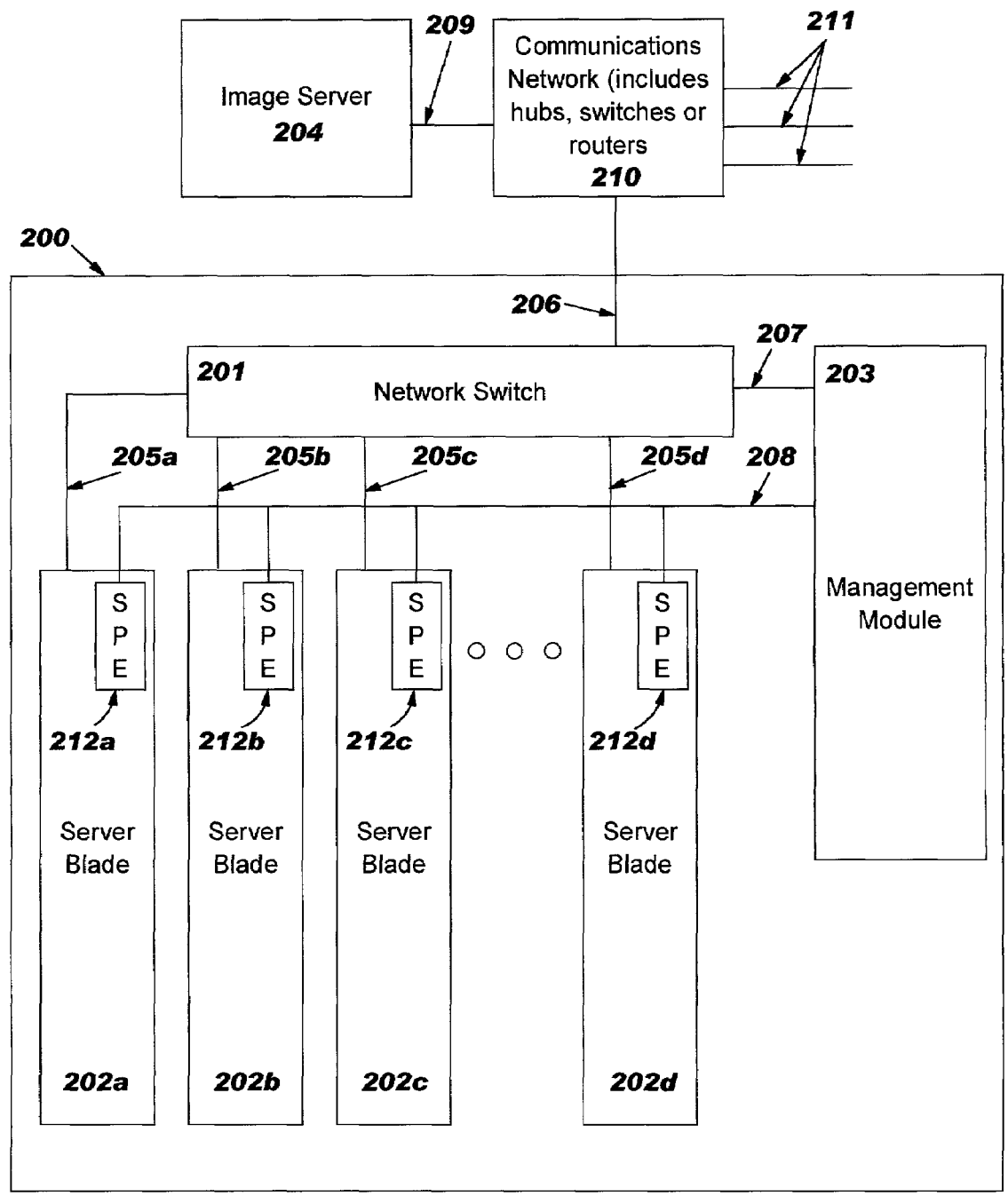

SYSTEM AND METHOD FOR PREVENTION OF BOOT STORMS IN A COMPUTER NETWORK

BACKGROUND OF THE INVENTION

This invention pertains to computers and other data processing systems and, more particularly, to computers and other data processing systems for use in a network in which an operating system, application, device driver, data or other software is stored on one computer system in the network and downloaded or "served" to other computer systems in the network.

A typical desktop computer system includes a non-volatile semiconductor memory, such as a well known "flash" memory, for storing program code commonly called "POST" or Power On Self Test. This typical desktop computer also includes a nonvolatile magnetic disk storage device, typically a hard disk drive, onto which the operating system, as well as other programs and data are stored. At power-up, the computer's central processing unit or "CPU" executes the POST code, which performs diagnostic checks, initializes the computer's internal devices, and then loads an operating system program called the "boot loader" from the local hard disk to the computer's main memory. After validating the boot loader code in main memory, control is passed to the boot loader, which loads and executes additional operating system programs and data stored on the hard disk.

In this way, the system loads the operating system kernel and any device drivers, management agents, communications stacks, application programs, etc., that are required for the computer system to become fully functional. The collection of operating system programs, device drivers, management agents, applications, etc., is often referred to collectively as an "operating system image" and is typically customized for a specific computer system or class of systems.

In the desktop computer example above, the operating system image was stored locally on the hard disk drive of the computer, an arrangement that can be described as a "local boot" system. In a network of a plurality of computers, computer servers, or other data processing equipment, it is possible to employ the local boot technique described above by storing a copy of the operating system image on each of the computers in the network, such that each computer boots the operating system from its local hard disk or other non-volatile mass storage device within or attached to each computer.

In addition, a well known "network boot" system can also be used in which the operating system image is not stored locally on each computer in the network, but is stored on a remote computer and downloaded to various computers, servers, and other data processing equipment in the network. The computer, server, or other data processing equipment storing an image to be downloaded will be referred to as an "image server", and a computer, server, or other data processing equipment in the network that is capable of receiving an image from the image server is referred to as a "client computer" or, simply, a "client."

Network booting is beneficial and desirable under circumstances where tight control is required over the operating system image, where the operating system image used by the client computers may change frequently, and where the availability of a local hard disk or other non-volatile mass storage device on the client computers is limited or non-existent. The use of client computers lacking a hard disk drive or other non-volatile mass storage device is particularly beneficial in reducing the total cost of ownership of a large network of computers, such as may be found in large corporations.

Network booting is not limited to desktop computers and workstations, but is increasingly being used in networks of servers. In addition, network booting is useful in dense-server packaging schemes, such as "server blades." A server blade is a complete computer server on a single printed circuit board. Typically, a dozen or more individual server blades can be plugged into a server blade chassis, which provides power, control and inter-blade communication capability.

It is common to find several hundred client computers in a network in which network booting is employed. If a large number of clients are started or restarted simultaneously, then the network and image server resources may become overburdened. For example, this may happen at the restoration of power after a power failure, at initial power-up of multiple rack mounted servers or server blades, or upon reception by a plurality of clients of a command from a management console to restart the operating system or obtain a new operating system image.

Because the network and server resources are not able to process all of the requests placed by a large number of clients in a relatively short time interval, some requests for images either fail or time-out, and therefore, must be retried at some time in the future. This results in a situation where a large number of requests flooding the network interferes with the successful handling of other requests and, therefore, causes a significant increase in the amount of network traffic, which may aggravate the situation even more. The term "boot storm" is used, in particular, to describe the situation in which the image server and network resources are overburdened from too many requests from clients for the operating system image. The term is also used expansively to describe the situation wherein, within a narrow window of time, too many clients make requests for any type image (application, device drivers, data or other computer code) which results in these resources becoming overburdened.

FIG. 1(a) is a graph representing network system boot performance during a boot storm in a prior art system, wherein the vertical axis 101 is indicative of the number of clients attempting to simultaneously access the image server, and the horizontal axis 102 indicates the total time required for the image server to download the boot image to all of the clients. Horizontal line 103 represents the maximum capacity, in terms of the number of clients simultaneously requesting an image from the image server, of the network resources to simultaneously download images to requesting clients. Plot 104 represents a boot storm scenario in a prior art system.

Note that, between times $t_0$ and $t_1$, the number of clients requesting an image from the image server is below maximum capacity line 103, from time $t_1$ to $t_2$ the number of clients requesting an image exceeds this maximum capacity and does not drop below the line until after time $t_2$. During the time $t_1$ to $t_2$ when the number of clients requesting service exceeds maximum capacity 103, clients will interfere with each other, messages will be retried, and responses will be lost. Occasionally, a client may decide that things are so bad that it will give up and may later decide to retry the process from the beginning (effectively throwing away whatever programs and data it was able to collect in the previous attempts). Because of the conflicts and interference, the time to complete the entire process of booting all clients, time $t_4$, takes longer than expected.

By comparison, FIG. 1(b) is identical to the graph of FIG. 1(a), except that plot 105 represents the network system boot performance of a system of the present invention in which the total number of clients requesting an image from the image server is identical to the total number of clients requesting service in the prior art system of FIG. 1(a). Note that at all times, plot 105 is below maximum capacity line 103. More importantly, note that all clients are serviced by time $t_3$ while, in the prior art system of FIG. 1(a), the total time to service all clients is time $t_4$. Thus, as will be described in more detail below, one of the many advantages of the present invention is that it can be used to prevent boot storms, thereby reducing the total boot time of a plurality of clients in a network boot environment.

SUMMARY OF THE INVENTION

Briefly, in one embodiment, the invention is a network including an image server for downloading software images and a plurality of clients coupled to the image server. A controller is coupled to each of the clients for individually controlling the operation of the clients, and for building a wait list of each client requiring an image from the image server. The controller is also for repetitively enabling each of the clients on the wait list to download an image from the image server until the total number of enabled clients is equal to "M", or until no more clients remain on the wait list. "M" is the maximum number of clients that are permitted to download an image from the image server at any one time.

In another embodiment, the invention is an assembly of clients (such as, but not limited to, a server blade chassis) for use with an image server. Included in the assembly are a plurality of clients, which are connectable to the image server. The assembly also includes a controller coupled to each of the clients for individually controlling the operation of the clients, and for building a wait list of each client requiring an image from the image server. The controller is also for repetitively enabling each client on the wait list to download an image from the image server until the total number of enabled clients is equal to "M" or until no more clients remain on the wait list. "M" is the maximum number of clients that are permitted to download an image from the image server at any one time.

In another embodiment, the invention is a method for controlling the downloading of images from an image server to a plurality of clients. In a first step, the method builds a wait list of clients that are requesting an image from the image server. In a next step, the method repetitively enables each client on the wait list to download an image from the image server until the total number of enabled clients is equal to "M", or until no more clients remain on the wait list. "M" is the maximum number of clients that are permitted to download an image from the image server at any one time.

BRIEF DESCRIPTION OF THE DRAWINGS

FIG. 2 is a block diagram of a network system of the present invention.

DESCRIPTION OF THE ILLUSTRATIVE EMBODIMENTS

Figure 1A:
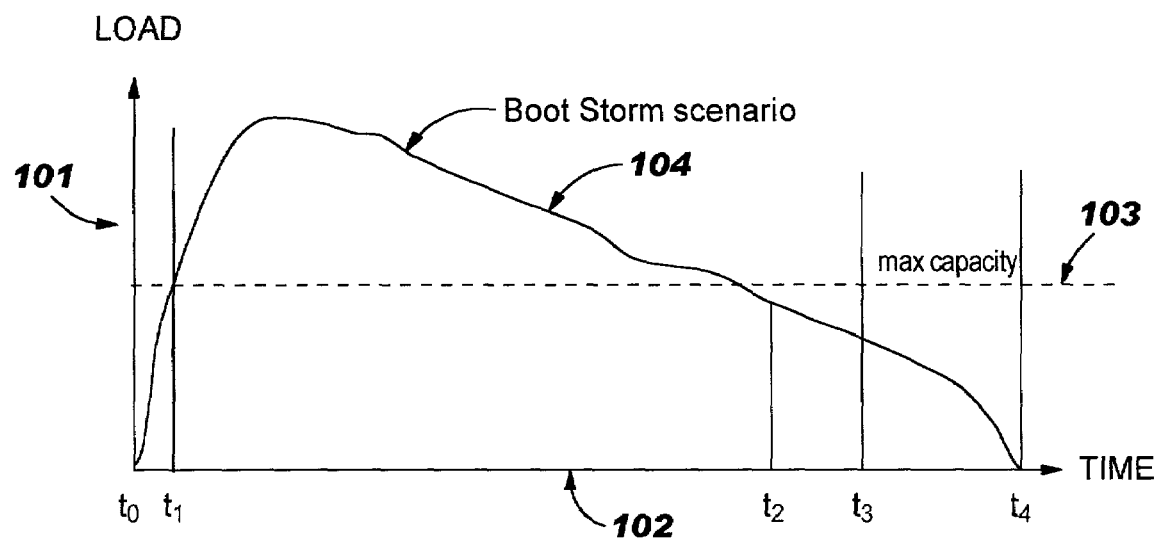
FIG. 1(a) is a graph representing network system boot performance during a boot storm of a prior art system, wherein the vertical axis is indicative of the number of clients attempting to simultaneously access the image server, and the horizontal axis indicates the total time required for the clients to boot from the image server.

In the following description of the illustrative embodiments, the best implementation of practicing the invention presently known to the inventors will be described with some particularity. However, this description is intended as a broad, general teaching of the concepts of the present invention in specific embodiments, and is not intended to limit the present invention to these embodiments. Those skilled in the relevant art will recognize that there are many variations and changes to the specific structure and operation shown and described in these embodiments that embody the broad, general teachings of the present invention.

The invention will now be described with respect to a network including an image server and a server blade chassis populated with a plurality of server blades. A server blade is is a complete computer server on a single printed circuit board. Typically, a dozen or more individual server blades can be plugged into a server blade chassis, which provides power, control and inter-blade communications channels. However, those skilled in the art will recognize that the invention may be practiced not only with server blades, but with any other computer, server, or data processing equipment that is capable of downloading a software image from an image server, and that these computers, servers and data processing equipment that obtain images from an image server will be referred to generally as a "client."

In FIG. 2, a server blade chassis 200 contains a plurality of densely packed "server blades" 202a-202d (collectively referred to as server blades 202). Each server blade 202 is a complete computer server on a printed circuit board and includes a main processor, memory, network interface circuitry, and other well known server circuits and functions (not illustrated). Each server blade 202 is designed to plug into one of a plurality of server blade connectors (not illustrated) on chassis 200 in a manner similar to an adapter board plugging into an I/O connector of a personal computer. Each server blade 202a-202d includes, respectively, a well known service processor element 212a-212d (collectively referred to as SPE's 212) which includes a service processor, memory and other well known circuitry. As is well known, each SPE 212 can place the main processor on the server blade in the reset state, and is also configured to remove power from the main processor. Server blade chassis 200 also includes a management module 203, which is connected to each SPE 212 through a management network 208, preferably a well known IEEE485 network. Certain functions of each server blade 202 can be controlled by commands sent by management module 203 across management network 208. Thus, management module 203 functions as a controller to individually control each server blade 202, as well as network switch 201.

A network switch 201, such as a well known gigabit ethernet switch, interconnects each server blade 202 through network links 205a-205d (collectively referred to as links 205). Network switch 201 is also connected to management module 203 through network link 207. In addition, network switch 201 is connected to an external communications network 210 via network link 206. Communications network 210 may include hubs, switches, routers and other well known network elements. Network link 209 connects network 210 to image server 204, which is a well know server or other computer system that includes an operating system image stored on a hard disk drive or other non-volatile mass storage device within or associated with the image sever.

Preferably, network links 205, 206, 207 and 209 are well known gigabit ethernet links, although other network connections may be used.

To boot server blades 202, the operating system image is downloaded from image server 204 to each server blade, rather than being stored locally on a hard disk drive or other non-volatile mass storage device that may or may not be included with each server blade. In addition, image server 204 may be responsive to requests for images arising from other "clients" (not shown) on other parts of the network 210 via network links 211.

In the prior art, when a server blade chassis is initially powered on, all server blades initiate a request for their respective operating system image from the image server. Depending upon the number of server blades, the size of the requested images, the bandwidth of the network, and the capabilities of the image server, a boot storm may result in which one or more of the system resources is over burdened. This is compounded by the realization that more than one server blade chassis, possibly located in the same mechanical rack, may also have received power at the same time, or that other clients on the network may also be using the resources of the same image server.

Figure 1B:
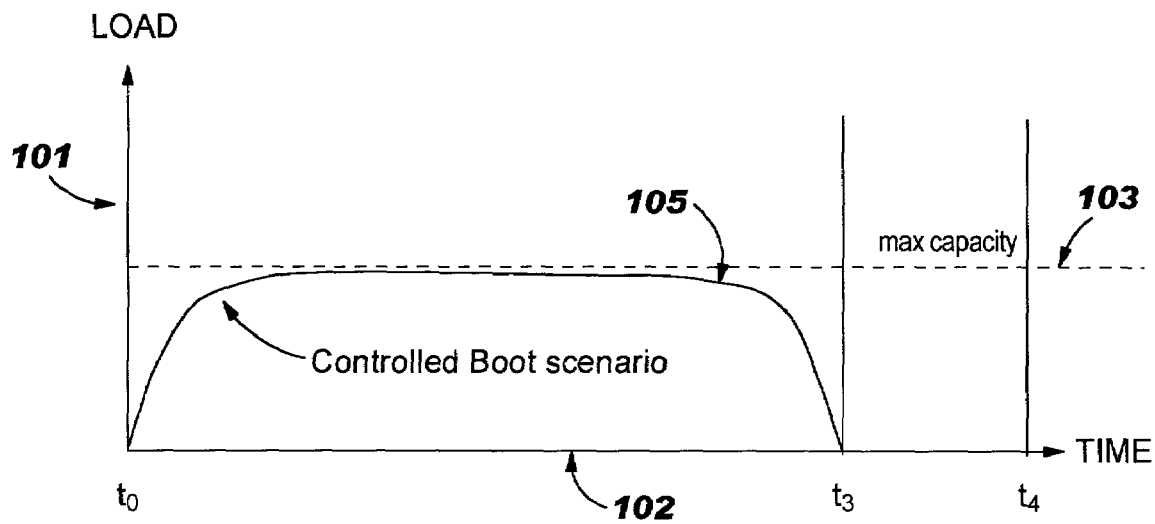
FIG. 1(b) is a graph representing network system boot performance of a system of the present invention, wherein the vertical axis is indicative of the number of clients attempting to simultaneously access the image server, and the horizontal axis indicates the total time required for the clients to boot from the image server.

In the current invention, a predetermined number of server blades 202 are allowed to boot to keep the network and the image server load just below the maximum capability. As those server blades finish, additional server blades are allowed to start. The point of control is management module 203, which is a centralized management resource. Using SPE's 112 in each server blade 202, management module 203 may instruct individual server blades 202 to be held in the reset state or have their power removed. In addition, using network connection 207, management module 203 may query and control the operation of network switch 201. Control of network switch 201 includes at least the ability to configure the Virtual LAN's ("VLANs") that determine the connectivity of network links 205 to external network link 106. Because of this staged booting, which is described in more detail with respect to FIG. 3, many of the retries and restarts of the prior art system are prevented, and the total time required for all server blades 204 to boot ($t_3$ in FIG. 1(b)) is substantially less than the total time in the prior art system ($t_4$ in FIG. 1(a)).

Figure 3:
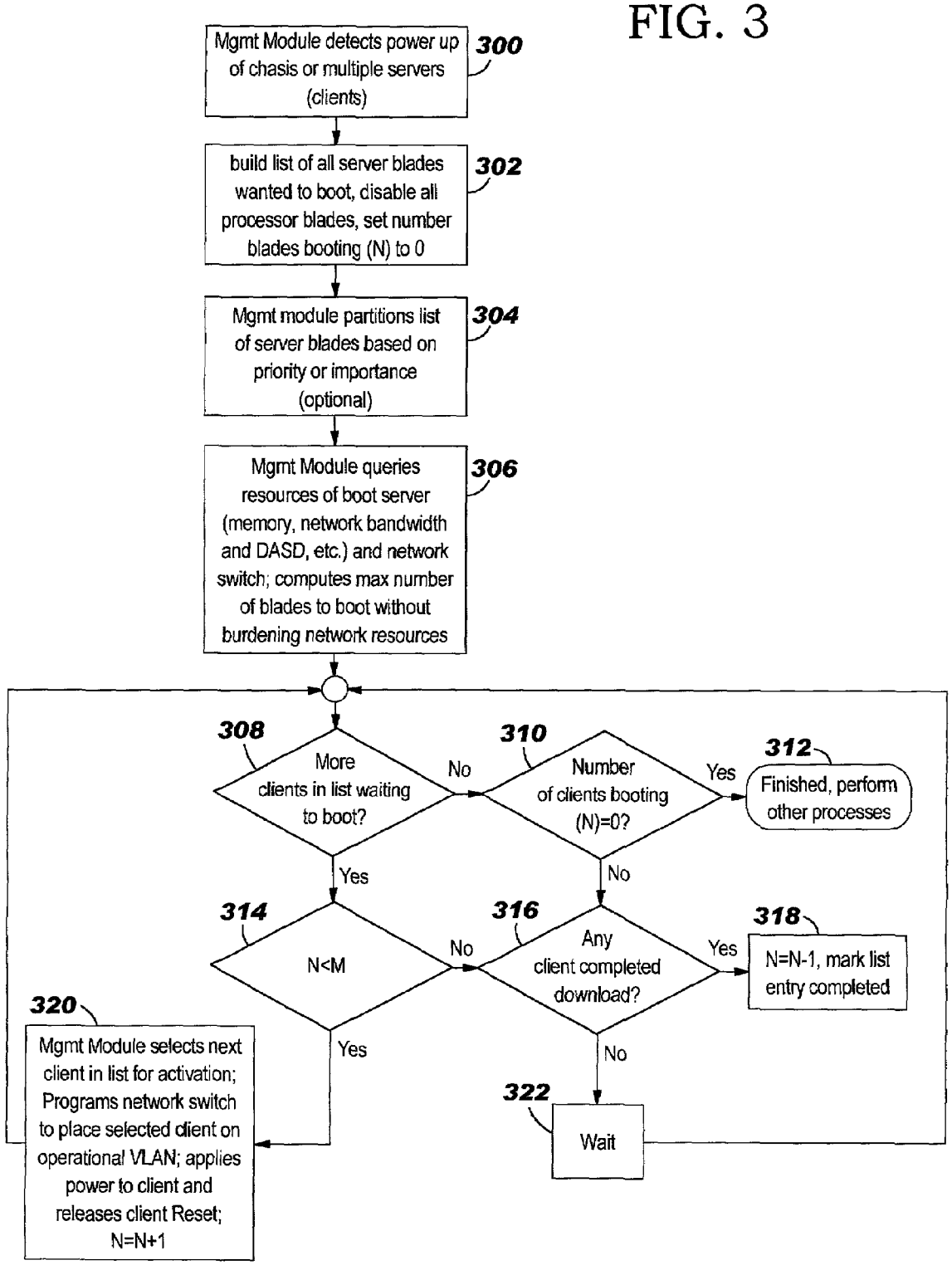
FIG. 3 is a logical flow diagram for the network boot logic portion of the management module of the present invention.

FIG. 3 is a logical flow diagram for the network boot logic portion of the management module of the present invention. Referring to this figure, in first step 300, the network boot logic portion of management module 203 detects an event that requires multiple server blades to request an operating system image from image server 204. Examples of such events include powering on chassis 200 and activating a number of server blades from sleep mode.

In next step 302, management module 203 builds a "wait-to-boot list" of all server blades 202 that currently need an image to boot. In addition, management module 203 sends an appropriate command or string of commands to disable each server blade on the wait-to-boot list, and then sets a counter "N" equal to zero. Counter "N" is used to indicate the total number of server blades currently in the process of booting.

There are a number of ways to disable a server blade 202, all of which will prevent the boot process from starting. For example, management module 203 may disable a particular server blade 202 by instructing the corresponding service processor element 212 to either remove power from the main processor on the server blade, or to hold the main processor in the reset state. While either of these commands will disable the server blade's main processor and prevent the boot process from starting, the service processor element remains powered and responsive to commands received from management module 203. Alternatively, management module 203 may disable a particular server blade 202 by preventing communications with image server 204. If a particular server blade cannot communicate with its boot image server, it is effectively disabled since it cannot boot without its boot image. To accomplish this, management module 203 instructs network switch 201 to reconfigure the VLAN's within the switch to prevent the server blade from communicating with image server 204 via communications network 210.

In one embodiment of the invention, each server blade may be preassigned a level of priority. If priority levels have been assigned, then the server blades currently on the wait-to-boot list are reordered in next step 204 in descending order of priority, such that the server blade with the highest priority will be allowed to download its boot image first. It is envisioned that any number of methods may be used to assign a particular level of priority to each of the server blades as is well understood in the art and, as such, is outside of the scope of the present invention.

In next step 306, management module 203 queries network switch 201 and image server 204 to determine the availability of resources, such as the amount of memory available in the image server, and other parameters indicative of network bandwidth. One way for management module 203 to acquire this information is through the use of well known SNMP instrumentation or other forms of well known management agents. Although only one query of the system resources is illustrated in FIG. 3, it is envisioned that network switch 201 and image server 204 can be queried repeatedly to allow for changing conditions in the system. Having determined the availability of network and server resources and related parameters, management module 203 can now estimate the maximum number "M" of server blades 202 that can be allowed to boot at any one time on the network without overburdening system resources.

In the alternative, "M" can be determined empirically by simple incrementing "M" and measuring the total time required to boot a fixed number of server blades. This fixed number of server blades must be larger than the maximum value of "M" used during empirical testing. The value of "M" that results in the shortest total boot time for this fixed number of server blades during empirical testing, is the value of "M" that should be used during normal operation of the system.

In next step 308, the network boot logic of management module 203 determines if there are any more server blades 202 on the wait-to-boot list. If not, the network boot logic jumps to step 310 to determine if any server blades 202 are currently booting. If no server blades 202 are currently booting, then N=0 and the network boot logic jumps to step 312 to complete the process. In step 312, management module 203 performs other processes before returning to step 300.

Returning to step 308, if there are one or more server blades 202 on the wait-to-boot list, the network boot logic jumps to step 314 to determine if the number of server blades currently booting N is less than the maximum number M. If N is less than M, the network boot logic jumps to step 320 wherein the next server blade on the wait-to-boot list is enabled, network switch 201 is programmed to place the selected server blade on the operational VLAN, and then N is incremented. Following the completion of step 320, the network boot logic returns to step 308.

Returning to step 314, if N=M, the network boot logic jumps to step 316 wherein management module 203 checks to determine if any previously booting server blade has completed its boot process. If a server blade has just completed its boot process, the network boot logic jumps to step 318 wherein "N" is decremented. After step 318, the network boot logic returns to step 308.

If, in step 316, the network boot logic fails to identify a server blade that has just completed its boot process, the network boot logic returns to step 308 after passing through wait state 322, which may be used by management module 203 to perform other management functions during the wait period.

The present invention as described contemplates a system with densely packed servers which include connections to a system management network 208 and a communication network 210, and a management module 203 for avoiding boot storms when multiple server blades 202 or other clients attempt to boot from an image server 204. Upon power up or other event, management module 203 will detect when multiple server blades 202 require a network boot operation. Management module 203 will acquire enough system information to control and regulate the number of server blades 202 allowed to boot from the communication network 210 at any instant of time via system management network 208. Management module 203 continuously monitors the system for changes and, upon detecting the completion of a boot by a server blade 202, will release via the system management network 208 any remaining server blades 202 who have been blocked from booting their respective images.

It is envisioned that management module 203 which controls the client 202 booting process will maintain a log of all transactions. This log can easily be used by the network administrator to configure the network topology to improve the network booting performance.

The instant invention has been shown and described herein in what is considered to be the most practical and preferred embodiment. It is recognized, however, that departures may be made within the scope of the invention and that obvious modifications will occur to a person skilled in the art that are within the scope and spirit of the claimed invention.

What is claimed is:

1. A network system configured to download an operating system image from an image server to a plurality of clients, comprising: a management logic module configured to query resources of the network system selected from the group consisting of available image server memory and available network bandwidth of a network used by the plurality of clients to communicate with the image server and, based at least in part on said query, determine a maximum number of clients to enable for simultaneous boot access to the image server within a threshold download time, wherein said determined maximum numbers of clients is less than a total plurality of clients in communication with the image server;

wherein the management logic module is further configured to increment the determined maximum number of clients and measure a total time required to boot a fixed number of clients of the plurality of clients, the fixed number larger than the incremented determined maximum number of clients, and select a one of the determined maximum number of clients and the incremented determined maximum number of clients that results in a shortest total boot time for the fixed number of the clients; and restrict simultaneous downloading of an operating image system by the clients from said image server to no more than the selected one of the determined maximum number and the incremented determined maximum number of the clients.

2. The network system of claim 1, wherein each of said clients is coupled to the image server through a programmable switch, and wherein the management logic module is configured to determine the maximum number of clients for simultaneous boot access based on queried resources of said programmable switch.

3. The network system of claim 2, wherein said management logic module is further configured to generate a list of said clients needing an image to boot and to issue a command to disable each client on said list or to prevent each client on said list from communicating with the image server.

4. The network system of claim 3, further comprising a printed circuit board having a main processor, a memory, and network interface circuitry in communication with the plurality of clients; and wherein the plurality of clients is a plurality of server blades each plugged into a corresponding server blade connector on a server chassis in communication with the network interface circuitry.

5. The network system of claim 4, wherein the management logic module is configured to use the programmable switch to enable or disable client communication with the image server.

6. The network system of claim 4, wherein each of said clients includes a service processing element in communication with the management logic module, and wherein the management logic module is configured to cause each service processing element to place a client power element in a reset state or remove power from a client service processor.

7. The network system of claim 6, wherein said image server is connected to each of said service client processing elements via an IEEE 485 network management network.

8. A method for controlling downloading of an operating system image from an image server to a plurality of clients, comprising:

querying resources of an image server connected to a plurality of clients, the resources selected from the group consisting of available image server memory and available network bandwidth;

based at least in part on the querying of the image server resources, determining a maximum number of the plurality of clients for simultaneous boot access to the image server within a threshold download time, wherein said determined maximum number of clients may-be is less than a total of the plurality of clients; p1 incrementing the determined maximum number of clients and measuring a total time required to boot a fixed number of clients of the plurality of clients, the fixed number larger than the incremented determined maximum number of clients;

selecting a one of the determined maximum number of clients and the incremented determined maximum number of clients resulting in a shortest total boot time for the fixed number of the clients during empirical testing; and restricting simultaneous downloading of an operating system image from said image server to no more than the selected one of the determined maximum number and the incremented maximum number of the clients.

9. The method of claim 8, wherein querying resources includes querying resources of a programmable network switch coupling each of said plurality of clients to the image server, and wherein determining the maximum number of the clients for simultaneous boot access is based on queried resources of said image server and said network switch.

10. The method of claim 9, wherein each of said clients includes a service processing element in communication with the image server, and wherein restricting simultaneous downloading comprises causing each service processing element of a plurality of the clients to place a client power element in a reset state or remove power from a client service processor.

11. The method of claim 10, further comprising:
   detecting an event that requires multiple clients of the clients to request an operating system image from the image server;
   in response to said event generating a list of said clients needing an image to boot;
   disabling each said client on said list;
   determining a total number of currently booting clients;
   if the total number of the currently booting clients is less than the determined maximum number, enabling a client on the list for simultaneous boot access to the image server; and
   repeating the steps of determining and enabling until the total number of currently booting clients equals the determined maximum number.

12. The method of claim 11, wherein disabling each client on said list comprises programming said switch to terminate communication between a disabled client and the image server; and
   wherein enabling a client on the list comprises programming said switch to enable communication between the image server and an enabled client on the wait list.

13. The method of claim 12, further comprising:
   if the total number of the currently booting clients equals the determined maximum number and the list contains a remaining client, determining if a one of the total number of the currently booting clients has completed its boot process, and
      if the one of the total number of currently booting clients has completed its boot process, decrementing the total number of the currently booting clients and repeating the steps of determining the total number of the currently booting clients, enabling a client until the total number equals the determined maximum number and determining if a one of the booting clients has completed its boot process; or
      repeating determining a one of the total number of the currently booting clients has completed its boot process after expiration of a wait period.

14. A method for downloading an operating system image to a plurality of clients, comprising:
   providing computer executable program code to be deployed to and executed on a computer system;
   the program code comprising instructions which, when executed on the computer system, cause the computer system to:
   query resources of an image server connected to a plurality of clients, the resources selected from the group consisting of available image server memory and available network bandwidth;
   based at least in part on the querying of the image server resources, determine a maximum number of the plurality of clients for simultaneous boot access to the image server within a threshold download time, wherein said determined maximum number of the clients is less than a total of the plurality of the clients;
   increment the determined maximum number of the clients and measure a total time required to boot a fixed number of clients of the plurality of clients, the fixed number larger than the incremented determined maximum number of the clients;
   select a one of the determined maximum number of the clients and the incremented determined maximum number of the clients resulting in a shortest total boot time for the fixed number of the clients during empirical testing; and
   restrict simultaneous downloading of an operating system image from said image server to no more than the determined maximum number of the clients.

15. The method of claim 14, further comprising:
   detecting an event that requires multiple clients of the clients to request an operating system image from the image server;
   in response to said event, generating a list of said clients needing an image to boot;
   disabling each client on said list;
   determining a total number of currently booting clients of the clients;
   if the total number of the currently booting clients is less than the determined maximum number of clients, enabling a client on the list for simultaneous boot access to the image server; and
   repeating the steps of determining and enabling until the total number of the currently booting clients equals the determined maximum number of clients.

16. A method for downloading an operating system image to a plurality of clients, comprising:
   storing computer executable program code on a computer readable medium; and
   providing the program code to be deployed to and executed on a computer system;
   the program code comprising instructions which, when executed on the computer system, causes the computer system to:
   query resources of an image server connected to a plurality of clients, said resources selected from the group consisting of available image server memory and available network bandwidth;
   based at least in part on the querying of the image server resources, determine a maximum number of the plurality of clients for simultaneous boot access to the image server within a threshold download time, wherein said determined maximum number of the clients is less than a total of the plurality of clients;
   increment the determined maximum number of the clients and measure a total time required to boot a fixed number of the clients, the fixed number larger than the incremented determined maximum number of the clients;
   select a one of the determined maximum number of the clients and the incremented determined maximum number of the clients resulting in a shortest total boot time for the fixed number of the clients during empirical testing; and
   restrict simultaneous downloading of an operating system image from said image server to no more than the determined maximum number of the clients.

* * * * *